(12) United States Patent
Gottlieb et al.

(10) Patent No.: US 9,185,451 B2
(45) Date of Patent: Nov. 10, 2015

(54) EXTENSIBLE ENCODING FOR INTERACTIVE EXPERIENCE ELEMENTS

(71) Applicant: Microsoft Corporation, Redmond, WA (US)

(72) Inventors: Gabriel Gottlieb, Seattle, WA (US); Kenneth Reneris, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/629,528

(22) Filed: Sep. 27, 2012

(65) Prior Publication Data

US 2013/0024905 A1 Jan. 24, 2013

Related U.S. Application Data

(62) Division of application No. 11/711,799, filed on Feb. 27, 2007, now Pat. No. 8,281,338.

(51) Int. Cl.
| | | |
|---|---|---|
| H04N 21/43 | (2011.01) | |
| H04N 21/8545 | (2011.01) | |
| H04N 21/418 | (2011.01) | |
| H04N 21/236 | (2011.01) | |
| H04N 21/434 | (2011.01) | |
| H04N 5/76 | (2006.01) | |
| H04N 7/16 | (2011.01) | |
| H04N 21/2368 | (2011.01) | |

(Continued)

(52) U.S. Cl.
CPC ............. *H04N 21/4341* (2013.01); *H04N 5/76* (2013.01); *H04N 7/16* (2013.01); *H04N 21/2368* (2013.01); *H04N 21/4325* (2013.01); *H04N 21/4334* (2013.01); *H04N 21/4345* (2013.01); *H04N 21/4758* (2013.01); *H04N 21/8173* (2013.01); *H04N 5/765* (2013.01); *H04N 5/781* (2013.01); *H04N 5/85* (2013.01); *H04N 5/907* (2013.01); *H04N 5/91* (2013.01); *H04N 9/8205* (2013.01)

(58) Field of Classification Search
None
See application file for complete search history.

(56) References Cited

U.S. PATENT DOCUMENTS

| | | | |
|---|---|---|---|
| 6,222,841 | B1 | 4/2001 | Taniguchi |
| 6,442,328 | B1 | 8/2002 | Elliott et al. |

(Continued)

FOREIGN PATENT DOCUMENTS

| | | |
|---|---|---|
| WO | 03085984 A1 | 10/2003 |
| WO | 2004025954 A1 | 3/2004 |
| WO | 2005099333 A2 | 10/2005 |

OTHER PUBLICATIONS

Asai et al. "MPEG-7 Meta-Data Enhanced Encoder System for Embedded Systems", Mar. 2004, http://www.merl.com/reports/docs/TR2004-009.pdf.

(Continued)

*Primary Examiner* — Brian T Pendleton
*Assistant Examiner* — Jean D Saint Cyr
(74) *Attorney, Agent, or Firm* — Judy Yee; Micky Minhas (57) ABSTRACT

Detailed herein is a technology which, among other things, allows for storage and playback of interactive user elements in a television stream. In one approach to this technology, a content data stream, including a television program and a user experience element, is received. This content data stream is transformed, and the transformed data stream is examined, to identify which packets are associated with the user experience element. Those packets are then passed to a handler appropriate for the user experience element.

18 Claims, 8 Drawing Sheets

(51) Int. Cl.
*H04N 21/432* (2011.01)
*H04N 21/433* (2011.01)
*H04N 21/475* (2011.01)
*H04N 21/81* (2011.01)
H04N 5/765 (2006.01)
H04N 5/781 (2006.01)
H04N 5/85 (2006.01)
H04N 5/907 (2006.01)
H04N 5/91 (2006.01)
H04N 9/82 (2006.01)

(56) References Cited

U.S. PATENT DOCUMENTS

| | | | |
|---|---|---|---|
| 6,981,045 B1 | 12/2005 | Brooks | |
| 6,999,479 B1 | 2/2006 | Jha | |
| 7,072,575 B2 | 7/2006 | Kang | |
| 7,089,579 B1 | 8/2006 | Mao et al. | |
| 7,376,964 B1 | 5/2008 | Kim | |
| 7,844,991 B1 * | 11/2010 | Nakamura et al. | 725/80 |
| 7,941,564 B2 * | 5/2011 | Gebhardt et al. | 709/248 |
| 7,987,479 B1 | 7/2011 | Day | |
| 2002/0120925 A1 | 8/2002 | Logan | |
| 2003/0091337 A1 | 5/2003 | Kubsch et al. | |
| 2003/0177503 A1 | 9/2003 | Sull et al. | |
| 2003/0188320 A1 | 10/2003 | Shing | |
| 2004/0022313 A1 | 2/2004 | Kim | |
| 2004/0033053 A1 | 2/2004 | Chen et al. | |
| 2004/0067042 A1 | 4/2004 | Hughes, Jr. | |
| 2004/0143851 A1 * | 7/2004 | Bergstrand | 725/131 |
| 2004/0220926 A1 | 11/2004 | Lamkin et al. | |
| 2005/0004901 A1 | 1/2005 | Mizobata et al. | |
| 2005/0031308 A1 | 2/2005 | Fu et al. | |
| 2005/0033760 A1 | 2/2005 | Fuller et al. | |
| 2005/0210510 A1 * | 9/2005 | Danker | 725/52 |
| 2006/0031889 A1 | 2/2006 | Bennett et al. | |
| 2006/0098002 A1 | 5/2006 | Inoue | |
| 2007/0226614 A1 * | 9/2007 | Lorenzen et al. | 715/530 |
| 2008/0184297 A1 * | 7/2008 | Ellis et al. | 725/39 |
| 2009/0060450 A1 * | 3/2009 | Daniels | 386/68 |

OTHER PUBLICATIONS

Mies et al. "The Personal Video Recorder: Home or Network Function?" Jun. 2003, http://www.rge.brabantbeedband.ni/docs/RGE_D4_1.pdf.

Nakane, et al. "A Content-Based Browsing System for a HDD and/or Recordable-DVD Personal Video Recorder" Jul. 2003 http://www.merl.com/papers/docs/TR2003-89.pdf.

* cited by examiner

Flowchart 400

Playback Module 700

FIG. 7

Flowchart 800

FIG. 8

EXTENSIBLE ENCODING FOR INTERACTIVE EXPERIENCE ELEMENTS

This application is a divisional of U.S. application Ser. No. 11/711,799, filed Feb. 27, 2007, the entire disclosure of which is hereby incorporated by reference.

BACKGROUND

In recent years, the field of television has been the subject of substantial innovation. High-definition content has provided a better picture, while digital delivery has allowed for greater interactivity with viewers. Devices like the digital video recorder (DVR) (or personal video recorder (PVR)) and the media center computer have allowed users an unprecedented degree of control over their television viewing time.

Interactive television services, in particular, offer the potential for a truly novel television viewing experience. Rather than the simple delivery of a single broadcast over a single channel, interactive television (iTV) offers users a richer user experience (UX). Existing content receivers, however, are coupled to "now" style UX, where interactive elements accompanying a broadcast are limited to use during actual broadcast time. Moreover, broadcasters are often tied into existing proprietary systems, which hinders their ability to adopt new platforms.

SUMMARY

Detailed herein is a technology which, among other things, allows for storage and playback of interactive user elements in a television stream. In one approach to this technology, a content data stream, including a television program and a user experience element, is received. This content data stream is transformed, and the transformed data stream is examined, to identify which packets are associated with the user experience element. Those packets are then passed to a handler appropriate for the user experience element.

In another approach to this technology, a system including an input module, a capture module, storage module, and a playback module is described. The input module receives interactive content. The capture module then examines this interactive content, and identifies a user experience element. The storage module allows the interactive content to be stored, and playback module extracts the stored interactive content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments and, together with the description, serve to explain the principles of the claimed subject matter:

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as digital media player 100, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage, such as a hard disk drive or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Interactive Television and Interactive User Experience

Interactive television, and the concept of an interactive user experience (UX), offer a substantial alteration to how television has been traditionally viewed. Rather than a user passively watching a broadcast, and interactive UX gives the user the opportunity to take a more active role in the viewing experience. Applications vary wildly; for example, a television quiz show could be accompanied by an interactive program, which downloads to the user's television, receiver, PVR, or media center, and which gives the user the opportunity to "play along" with the show, entering their answers to the questions being asked of the contestants, and keeping track of their hypothetical score.

Widescale adoption of such technology, as well as further developments in this field, are hindered by the technology already in place. For example, certain UX elements are limited to "now" functionality; such elements cannot be recorded to a PVR and utilized at a later time when viewing the recorded program. Further, those broadcasters which already support UX elements of this nature tend to have expensive investments in proprietary, and incompatible, broadcast systems. Such investments make adopting a completely new, standardized solution less attractive.

Embodiments seek to address these barriers. Several of the embodiments described below, for example, leverage an existing standard to shift the burden, in part, from the transmission side to the reception side. This utilization of the MPEG-2 transport stream allows a "now" UX broadcast, being transmitted in a proprietary system, to be transformed and stored in a uniform way, and to be played back at a later point. Broadcasters, therefore, would not need to abandon the existing investments in proprietary systems; the functionality of such embodiments allows for both versatility and extensibility in developing, recording, and utilizing interactive UX elements.

Media Center Network

Figure 1:
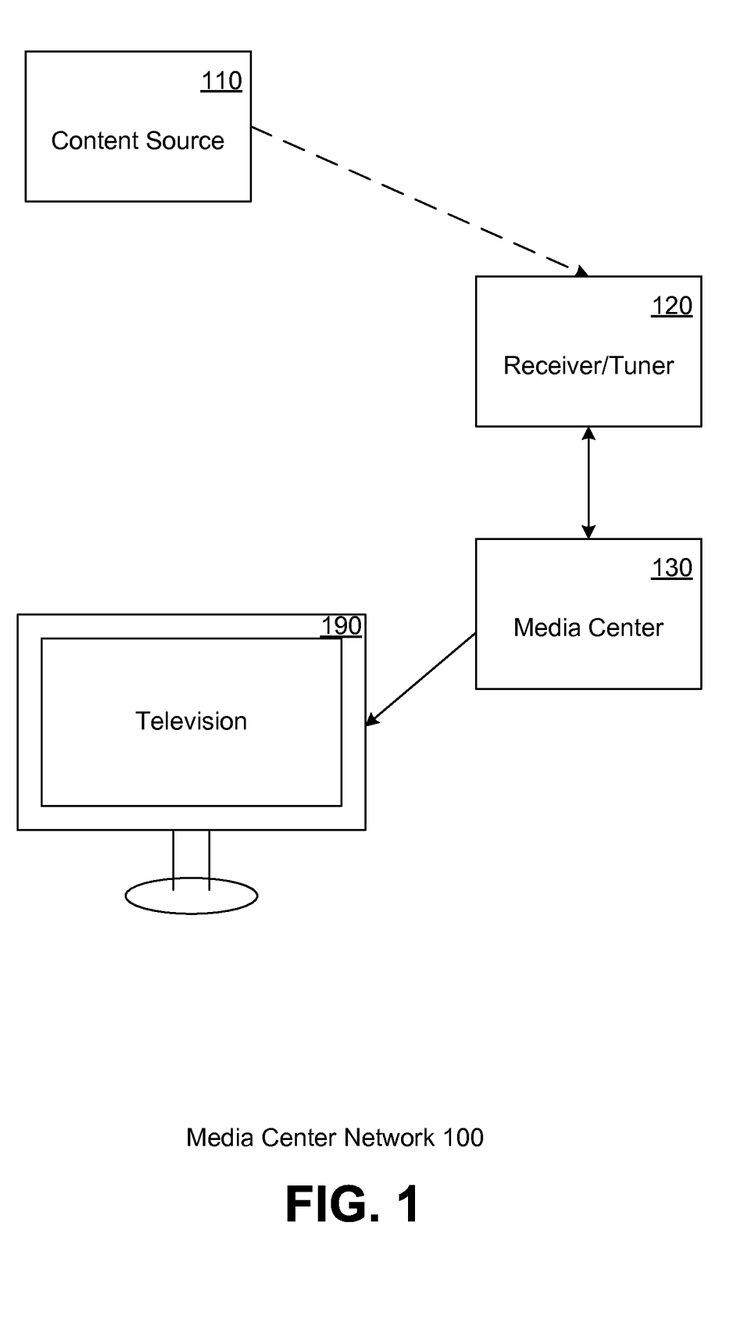
FIG. 1 is a block diagram of a media center network, in accordance with one embodiment.

With reference now to FIG. 1, a media center network 100 is depicted, in accordance with one embodiment. While media center network 100 is shown as incorporating specific, enumerated features, it is understood that embodiments are well suited to applications involving fewer, additional, or different elements and/or configurations. In particular, functionality described to one or more enumerated elements may be merged into fewer elements, or spread across multiple elements.

In the embodiment shown in FIG. 1, media center network 100 includes a content source 110. In some embodiments, content source 110 is a television signal broadcaster. In several such embodiments, content source 110 enables delivery of television content by radio transmission, coaxial or fiber-optic network, or satellite transmission. In other embodiments, the nature of content source 110 may differ from these examples.

As shown in FIG. 1, media center network 100 includes a signal receiver 120. The nature of receiver 120 may vary, across different embodiments. In one embodiment, for example, receiver 120 is a digital television receiver. In a different embodiment, receiver 120 may function both as a digital television receiver and a personal video recorder (PVR). In other embodiments, the nature of receiver 120 may differ from these examples.

Media center network 100 is also shown as including a media center 130. The nature of media center 130 may vary, across different embodiments. In some embodiments, for example, media center 130 may include PVR functionality. In some embodiments, receiver 120 and media center 130 may be combined into a single unit. In other embodiments, the nature of media center 130 may vary from these examples.

Media center network 100, as depicted, includes a television 190. In this embodiment, television 190 is used to display content transmitted by content source 110, and/or content generated by receiver 120 or media center 130. In other embodiments, the nature of television 190 may vary from these examples.

Media Center

Figure 2:
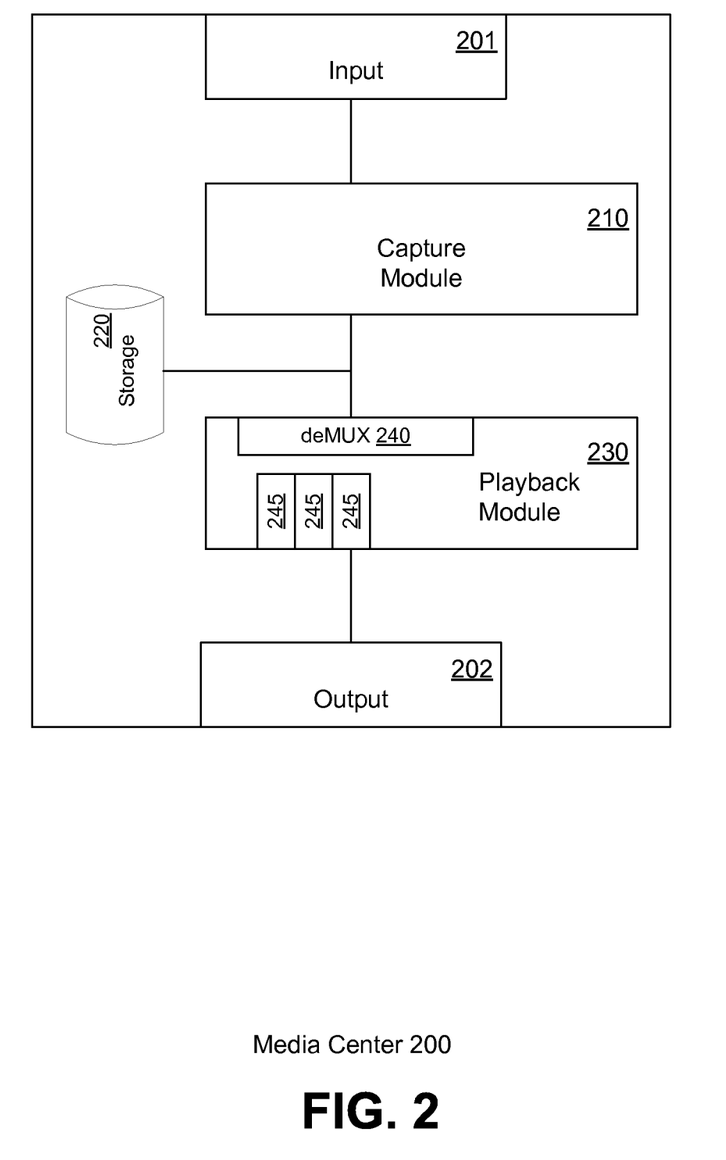
FIG. 2 is block diagram of a media center, in accordance with one embodiment.

With reference now to FIG. 2, a media center 200 is depicted, in accordance with one embodiment. While media center 200 is shown as incorporating specific, enumerated features, it is understood that embodiments are well suited to applications involving fewer, additional, or different elements and/or configurations. In particular, functionality described to one or more enumerated elements may be merged into fewer elements, or spread across multiple elements.

Media center 200 is depicted as including input module 201. In the depicted embodiment, input module 201 allows data, such as interactive television content, to enter media center 200. In some embodiments, input module 201 may be communicatively coupled to a digital television receiver or tuner.

As shown in FIG. 2, media center 200 also includes capture module 210. In some embodiments, capture module 210 examines data, such as interactive television content, in order to identify interactive UX elements. Such embodiments are described in greater detail, below.

Media center 200 also shown as including storage 220. In some embodiments, storage 220 is used to store interactive television content for later viewing, e.g., PVR functionality. In some embodiments, storage 220 is not a part of media center 200; in several such embodiments, media center 200 has access to an external storage device, e.g., network attached storage. In other embodiments, other implementations are utilized.

In the depicted embodiment, media center 200 includes playback module 230. In some embodiments, playback module 230 is used to playback stored television content. As shown, playback module 230 includes deMUX module 240, and multiple plug-in modules 245. In other embodiments, configuration of these elements may vary; for example, in one embodiment, a deMUX module is incorporated into the capture module, such as capture module 210, rather than the playback module. Embodiments utilizing these elements are described in greater detail, below.

UX Packets and the Mpeg-2 Transport Stream

Figure 3:
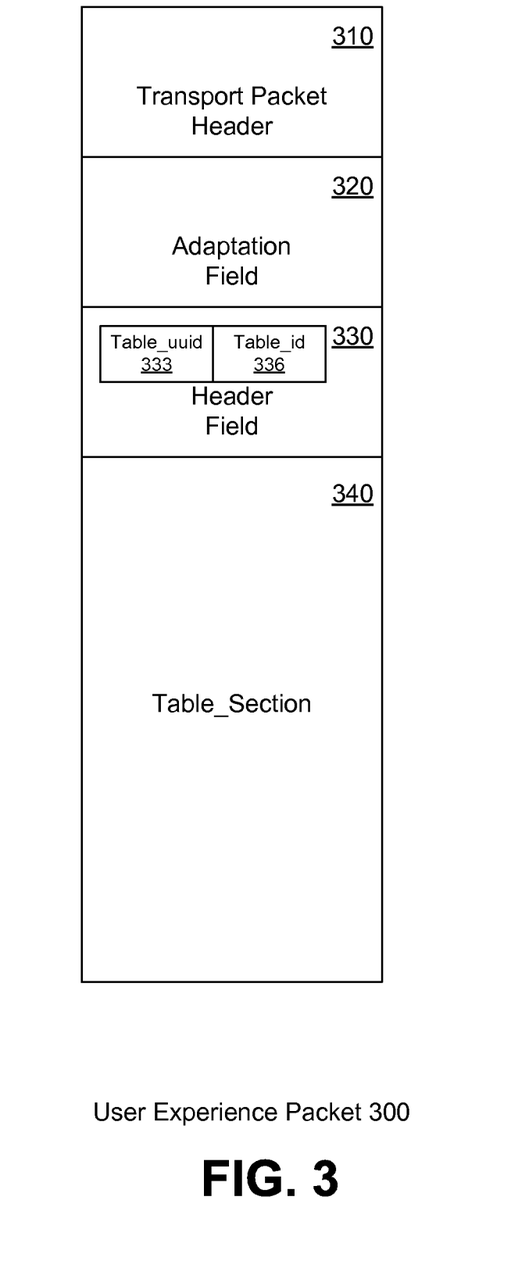
FIG. 3 is representation of a user experience packet, in accordance with one embodiment.

With reference now to FIG. 3, a representation of a user experience (a UX) packet 300 is depicted, in accordance with one embodiment. While UX packet 300 is shown as incorporating specific, enumerated features, it is understood that embodiments are well suited to applications involving fewer, additional, or different elements and/or configurations. In particular, functionality described to one or more enumerated elements may be merged into fewer elements, or spread across multiple elements.

UX packet 300 is depicted as including transport packet header 310, adaptation field 320, TAG header field 330, and table section 340. In the depicted embodiment, TAG header field 330 is shown as including table_uuid 333 and table_id 336. As shown, UX packet 300 conforms to the MPEG-2 transport stream protocol. Specifically, in some embodiments, UX packet 300 follows the format requirements for an adaptation packet.

In some embodiments, UX elements can be subdivided or broken up across multiple UX packets. In several such embodiments, transmission of these UX packets in the data stream is limited, in such a way so as to not interfere with transmission of other content, such as video and audio streams. In one embodiment, for example, UX packets are limited to no more than 5% of the transport stream. In many such embodiments, before a particular UX element can be utilized, or stored, it must be reassembled. In one such embodiment, the payload of each packet is inserted into a table at its appropriate place, until every portion of the table has been received.

Table 1, below, provides a detailed layout of one such UX packet. In other embodiments, the layout of the UX packet will vary.

TABLE 1

| Field | # of bits | Binary value | Datatype |
|---|---|---|---|
| transport_packet header | | | |
| sync_byte | 8 | 0100 0111 | |
| transport_error_indicator | 1 | 0 | |
| payload_unit_start_indicator | 1 | 0 | |
| transport_priority | 1 | 0 | |
| pid | 13 | 00000 0000 0000 | |
| transport_scrambling_control | 2 | 00 | |
| adaptation_field_control | 2 | 10 | |
| continuity_counter | 4 | | |
| adaptation_field | | | |
| adaptation_field_length | 8 | 1011 0111 | |
| discontinuity_indicator | 1 | 0 | |
| random_access_indicator | 1 | 0 | |
| elementary_stream_priority_indicator | 1 | 0 | |
| PCR_flag | 1 | 0 | |
| OPCR_flag | 1 | 0 | |
| splicing_point_flag | 1 | 0 | |
| transport_private_data_flag | 1 | 1 | |
| adaptation_field_extension_flag | 1 | 0 | |
| transport_private_data_length | 8 | 1011 0101 | |
| Header | | | |
| table_id | 8 | | uintb8 |
| table_uuid | 128 | | uuidb |
| version_number | 16 | | uintb16 |
| section_number | 16 | | uintb16 |
| last_section_number | 16 | | uintb16 |
| Table_section | 8 * 158 | | uintb8 |

In some embodiments, the contents of the transport packet header conform to the MPEG-2 transport stream protocol. In some embodiments, the contents of the adaptation field also conform to the MPEG-2 transferred stream protocol.

In several such embodiments, the contents of the header field are utilized in a number of ways. In one such embodiment, the table_uuid entry serves to identify this packet as being a UX packet, rather than some other adaptation field packet. As shown, table_uuid is a 128 bit number, selected such as to effectively prevent possible collisions with other adaptation field packets. In other embodiments, other types of variable may be used.

In the embodiment shown in Table 1 table_id is utilized to further identify the type of UX packet. For example, different types of interactive UX elements may be handled by different applications running on a media center. The table_id of a UX packets can be used to determine which application should handle the UX element related to this packet.

In some embodiments, version_number differentiates packets related to differing versions of the same table. For example, version_number can be used to decrease the needed storage, e.g., by detecting duplicate tables. In other embodiments, version_number may be used differently, e.g., to differentiate between packets related to one UX element from those relating to another UX element, when those UX elements share the same table_id. For example, when two UX elements should both be handled by the same application, they may share an identical table_id, but different version_numbers.

Further, in some embodiments, the table_id and version_number of a UX packet is used in reassembling the payloads of multiple UX packets into a single, complete table. In several such embodiments, section_number identifies where in the table the payload of this particular UX packet belongs, while last_section_number identifies how large the table this packet belongs to should be, when complete.

In some embodiments, table_section contains the payload of this particular UX packet, e.g., 158 bytes worth of a UX element. In several embodiments, table_section is included in the header field.

Encoding User Experience Elements within a Data Stream

Figure 4:
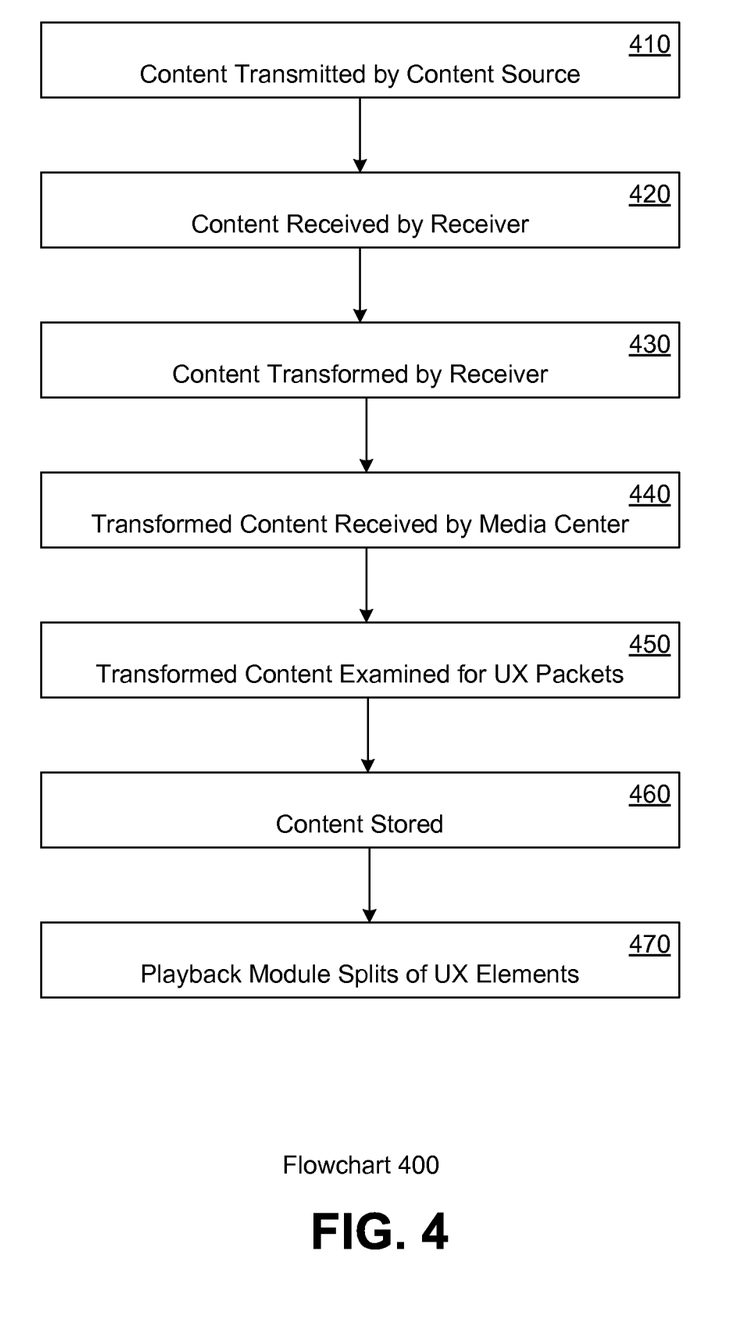
FIG. 4 is a flowchart of a method of encoding user experience elements within a data stream, in accordance with one embodiment.

With reference now to FIG. 4, a flowchart 400 of a method of encoding user experience (UX) elements within a data stream is presented, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 410, some content is transmitted by a content source. In one embodiment, this content comprises an interactive television program, with an accompanying interactive UX element. In some embodiments, the format of the content, e.g., the protocol used to transmit the content, varies. In several such embodiments, for example, content is broadcast from the content source in accordance with some proprietary protocol, while in other embodiments, content is broadcast in a standardized format. Further, in some embodiments, the nature of the content source will vary; in one embodiment, for example, the content source is a digital television satellite service provider.

For example, with reference to FIG. 1, content source 110 broadcasts a television quiz show, with an accompanying interactive "play at home" UX element.

With reference to step 420, this content is received by a receiver. In some embodiments, the nature of this receiver will vary.

Continuing the example, receiver 120 receives the broadcast of the television quiz show.

With reference to step 430, the content is transformed by the receiver. In some embodiments, where content is broadcast in a nonstandard format, e.g., in the content source's proprietary format, the content must be transformed from the broadcast format into a format usable by the devices present at the receiving end, e.g., by a media center. In some embodiments, this transformation entails converting a proprietary format for digital television transmission into the MPEG-2 transport stream format, with UX elements transformed into MPEG-2 transport stream adaptation packets, such as the UX packets defined by FIG. 3 and Table 1.

Continuing the example, receiver 120 converts the broadcast of the television crew shown from a proprietary format used by content source 110, a satellite television service provider, into a corresponding MPEG-2 transport stream, with the UX element transformed into UX packets, as described by FIG. 3 and Table 1.

With reference to step 440, the transformed data stream is received by a media center. In some embodiments, e.g., where a receiver also provides PVR or media center-like functionality, this step may involve passing the transformed data stream from one module within the receiver to another module. In other embodiments, the step may involve transmitting the transformed data stream from a discrete receiver unit to a discrete media center unit. In other embodiments, other configurations may be used.

Continuing the example, media center 130 receives a transformed data stream from receiver 120.

With reference now to step 450, a capture module within the media center examines the transformed data stream, and identifies UX element packets. An example of the operation of one embodiment of such a caption module is provided below, with reference to FIGS. 5 and 6. In some embodiments, the step entails identifying packets associated with various UX elements and reassembling the packets into the UX elements.

Continuing the example, with reference now to FIG. 2, capture module 210 within media center 200 examines the transformed data stream. Those packets within the data stream corresponding to the "play at home" UX element are identified, and reassembled.

With reference now to step 460, the program is stored. In some embodiments, the data stream necessary for playback of the program is stored, e.g., in an order which facilitates later playback, and the data corresponding to UX elements is stored alongside the program data, in a way so as to enable interaction with the UX element at an appropriate later time. For example, if an interactive element was intended to be available during a particular portion of a television broadcast, it can be stored in a way which allows it to be loaded and used at an appropriate point during playback of the recorded broadcast. In this manner, these embodiments can maintain the functionality of "now" UX elements, in recording situations.

Continuing the example, the quiz show is stored in storage 220. The reassembled "play at home" UX element is also stored in storage 220. When playback occurs, playback of the quiz show and execution of the UX element can be linked, such that the presentation intended for the original broadcast is preserved; e.g., the user playing at home will be able to answer the questions currently being asked of the contestants.

With reference now to step 470, the stored program is played. In some embodiments, a playback module, e.g., within the media center, extracts the stored television program and its accompanying UX elements from storage. Within the playback module, a deMUX element splits off those packets related to various UX elements from the data stream, for handling by appropriate handlers. One example of such embodiment is presented below, with reference to FIGS. 7 and 8.

Continuing the example, playback module 230 extracts the stored quit show from storage 220. DeMUX 240 splits off those packets relating to the "play at home" UX element, and passes them to an appropriate plug-in 245.

Capture Module

Figure 5:
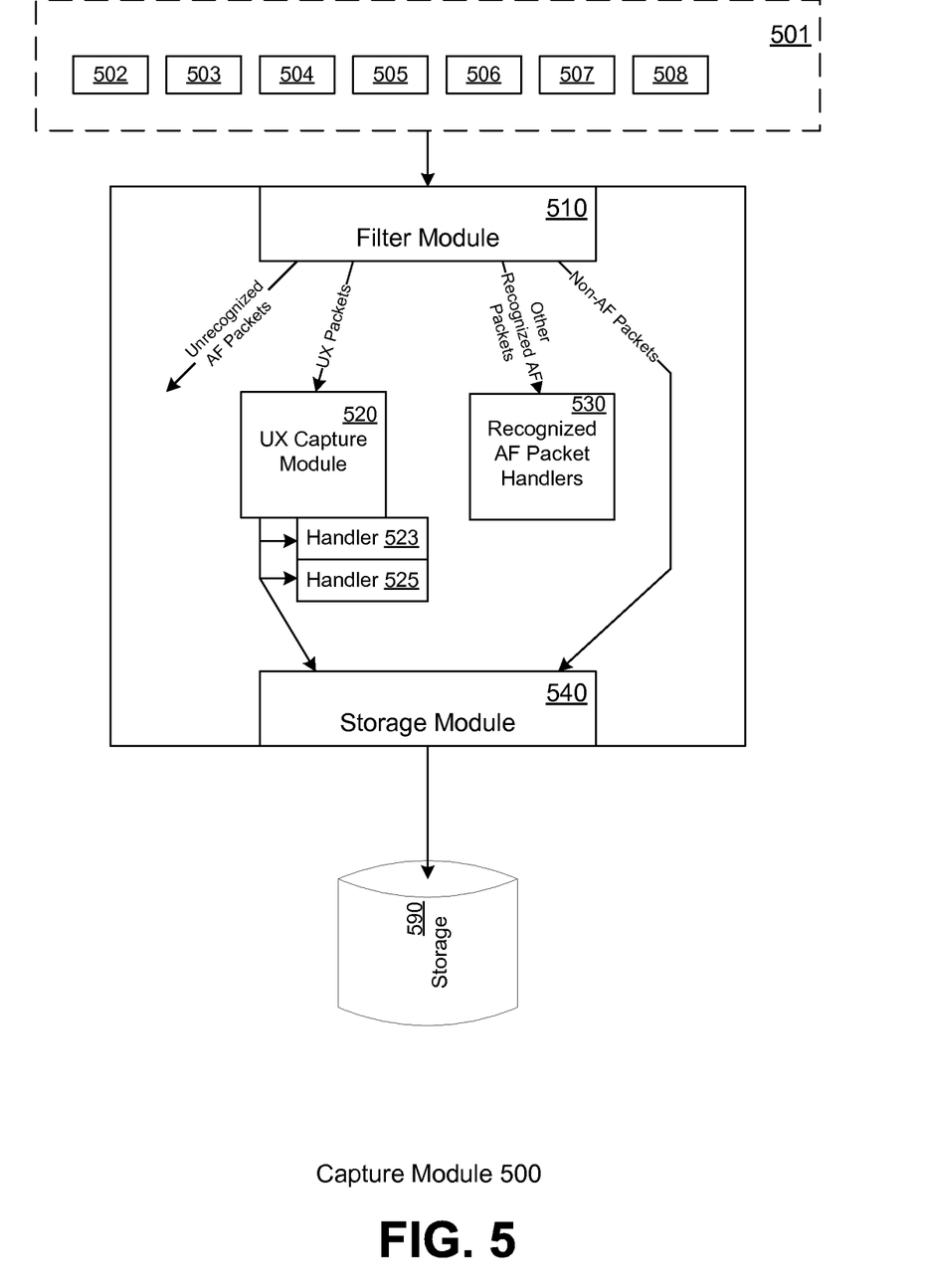
FIG. 5 is a block diagram of a capture module, in accordance with one embodiment.

With reference now to FIG. 5, a block diagram of a capture module 500 is presented, in accordance with one embodiment. While capture module 500 is shown as incorporating specific, enumerated features, it is understood that embodiments are well suited to applications involving fewer, additional, or different elements and/or configurations. In particular, functionality described to one or more enumerated elements may be merged into fewer elements, or spread across multiple elements.

As depicted, capture module 500 includes filter module 510, UX packet capture module 520, a number of UX element handlers, e.g., handlers 523 and 525, recognized AF packet handlers 530, and storage module 540. An example of the operation of capture module 500 is presented below, with reference to FIG. 6.

Figure 6:
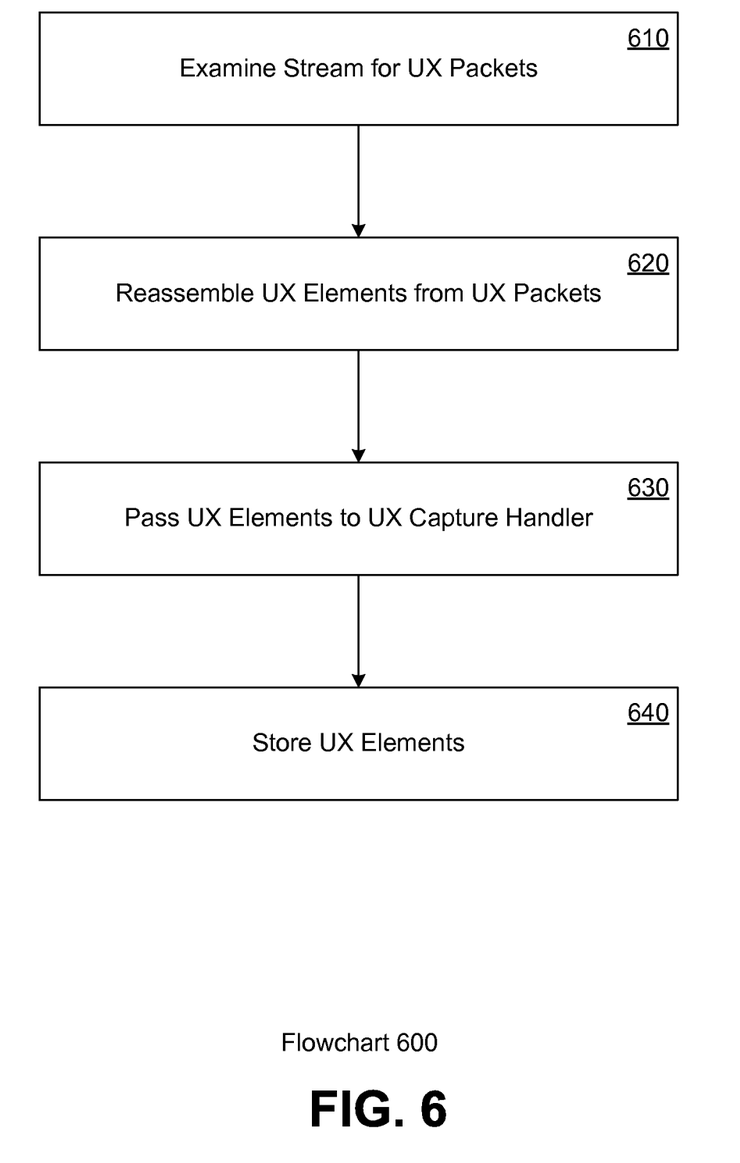
FIG. 6 is a flowchart of a method of capturing UX packets from a data stream is presented, in accordance with one embodiment.

With reference now to FIG. 6, a flowchart 600 of a method of capturing UX packets from a data stream is presented, in accordance with one embodiment. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 610, a data stream is examined to identify packets associated with an interactive user experience (UX) element. In some embodiments, an MPEG-2 transport stream is utilized to transmit data from some source, e.g., a television service provider, or a television receiver, to a media center containing a capture module. In one such embodiment, packets related to UX elements can be identified as being adaptation field (AF) packets.

In some embodiments, AF packets have uses beyond transmitting UX elements. In several such embodiments, it is necessary to further filter the AF packets, to identify which are related to UX elements, and which are intended for other purposes. Further, in some embodiments, some AF packets may not be recognized; these should be filtered off and discarded.

For example, with reference to FIG. 5, MPEG-2 transport stream 501 is shown as comprising a number of packets, e.g., packets 502 through 508. Of these, packets 502, 503, 505, and 507 are AF packets. Filter module 510 examines stream 501, and filters now to these AF packets. The remainder of stream 501, e.g., packets 504, 506, and 508 are data packets related to the television program, such as video or audio packets, and are passed to storage module 540.

AF packets 502, 503, 505, and 507 are further filtered, to identify whether they are UX packets. In one embodiment, where UX packets follow the format provided in FIG. 3 and Table 1, the table_uuid of these packets can be examined Those packets with a table_uuid corresponding to unknown UX element can be passed to UX capture module 520, while those AF packets which are otherwise recognized can be passed to recognized AF packet handlers 530, and those AF packets which are not recognized can be discarded.

With reference now to step 620, the UX element is reassembled. In some embodiments, each UX packet includes information as to which UX element it belongs, and in which order. In one such embodiment, where UX packets are formatted according to the format provided in FIG. 3 and Table 1, the combination of the table_id, version_number, and section_number of each UX packet enables reassembly of the UX element, by inserting the payload of each UX packet into the corresponding table at its corresponding location.

For example, UX capture module 520 examines the UX packets received from filter module 510. If those UX packets are formatted according to the format in FIG. 3 and Table 1, then UX capture module 520 can reassemble one or more tables from the payloads of those packets.

With reference now to step 630, the reassembled a UX element is passed to an appropriate handler. In some embodiments, different types of UX elements are handled differently, e.g., with respect to storage for later playback. In several such embodiments, a flexible and extendable approach is utilized, wherein a number of UX capture handlers can be loaded into the capture module, where each such UX capture handler is intended to handle one or more different types of UX elements.

For example, when the UX capture module 520 has reassembled a UX element table, it can pass the completed table to an appropriate UX capture handler, such as UX capture handler 525.

With reference now to step 640, the UX element is stored. In some embodiments, reassembled a UX elements are stored alongside the accompanying television program, in such a way so as to allow playback of that element to occur at the appropriate time. For example, if an interactive UX element was intended to be available during a particular portion of a broadcast, it can be stored in such ways as to allow playback to occur during that portion of the recorded broadcast as well, e.g., with UX element packets interwoven into the stored data stream at appropriate locations. In some embodiments, this can be utilized in a variety of ways. For example, in one such embodiment, linking interactive elements with playback of the broadcast could allow a broadcaster to collect information about interaction with that element by viewers who have recorded a program, rather than watching it when broadcast.

For example, UX capture handler 525 stores the reassembled US element in storage module 540, alongside the program transmitted by stream 501.

Playback

Figure 7:
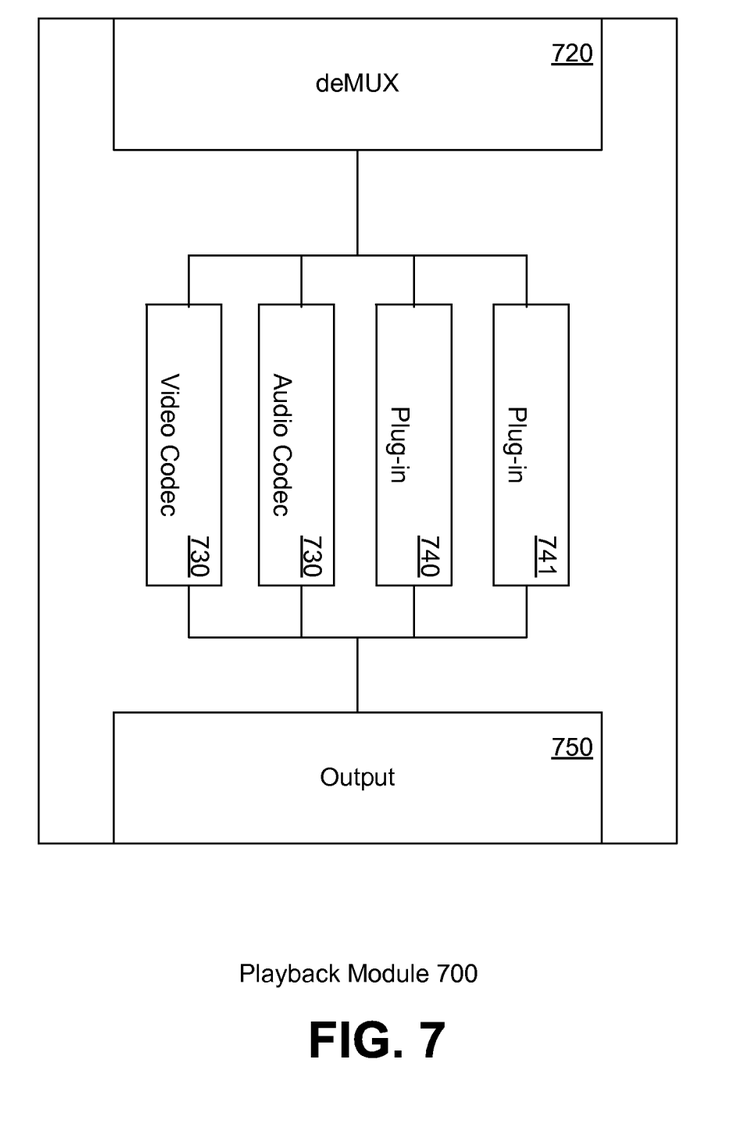
FIG. 7 is a block diagram of a playback module, in accordance with one embodiment.

With reference now to FIG. 7, a block diagram of a playback module 700 is presented, in accordance with one embodiment. While playback module 700 is shown as incorporating specific, enumerated features, it is understood that embodiments are well suited to applications involving fewer, additional, or different elements and/or configurations. In particular, functionality described to one or more enumerated elements may be merged into fewer elements, or spread across multiple elements.

The module 700 is depicted as including deMUX module 720, which is connected to a number of playback devices, such as video coder/decoder 730, audio coder/decoder 735, and plug-ins 740 and 741. Playback module 700 also includes output 750. An example of the operation of playback module 700 is described below, with reference to FIG. 8.

Figure 8:
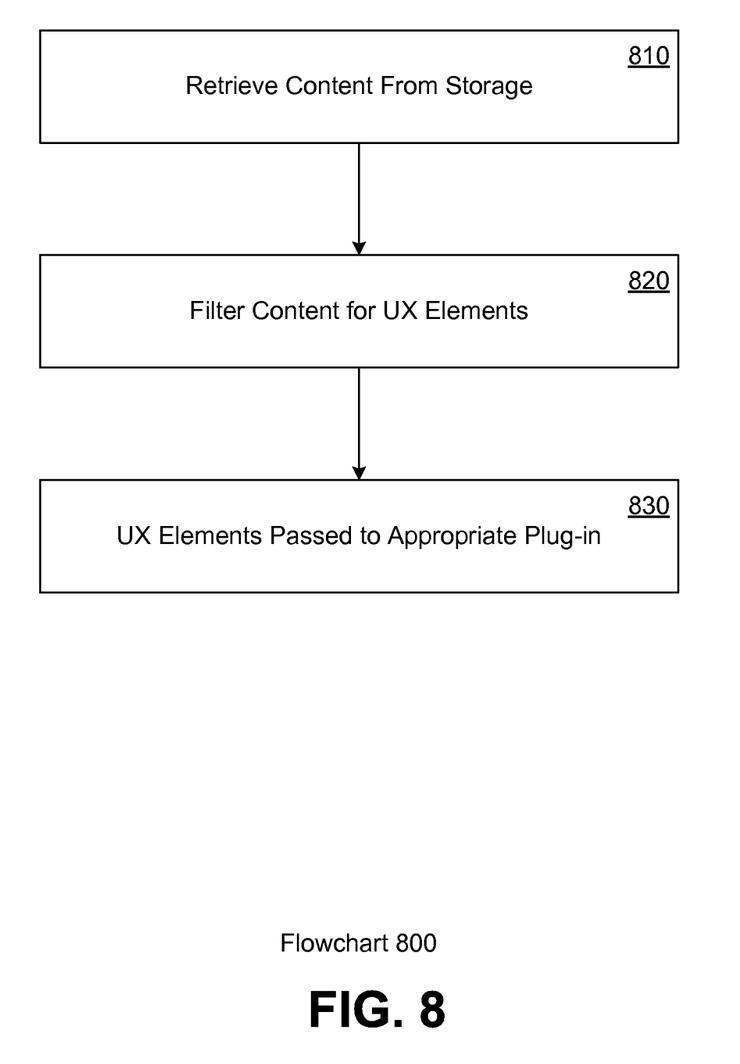
FIG. 8 is a flowchart of a method of playing back stored interactive content is presented, in accordance with one embodiment.

With reference now to FIG. 8, a flowchart 800 of a method of playing back stored interactive content is presented, in accordance with one embodiment. Although specific steps are disclosed in flowchart 800, such steps are exemplary. That is, embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

With reference now to step 810, stored content is retrieved. In some embodiments, e.g., where a PVR is utilized, content may be stored for an indefinite period of time. In other embodiments, content may only be temporarily stored, e.g., buffered, before playback occurs. The nature of the stored content will vary, across different embodiments. In some embodiments, interactive user experience (UX) elements may be stored alongside the broadcast they were transmitted with.

For example, playback module 700 retrieves stored content from storage 790, including one or more UX elements which accompanied a television program.

With reference now to step 820, the retrieved content is filtered to separate a UX element from the accompanying television program. In some embodiments, this is accomplished by utilizing a deMUX module, where the portion of the data stream which makes up the television program can be separated from the portion that makes up the UX element.

For example, the retrieved content is passed through deMUX 720. Those packets associated with one or more UX elements accompanying the television program are split off from the packets associated with the audio or video signals which make up the program itself.

With reference now to step 830, the UX elements are passed to appropriate handlers. In some embodiments, one or more discrete handlers or plug-ins are present within the playback module, to allow for handling of multiple different types of interactive UX elements. These embodiments allow for a flexible and extendable approach to handling a UX elements. For example, if a new type of UX element is desired, it is only necessary to provide a new plug-in or handler to allow the playback module to utilize the new type of element. In several such situations, new functionality can therefore be added with a simple installation of a new piece of software.

For example, the UX element is passed to plug-in 740, while the data corresponding to audio signals is passed to audio codec 735, and the data corresponding to video signals is passed to video codec 730. The plug-ins and codecs provide output for output module 750.

Error Handling

In some embodiments, this same manipulation of the data stream can be used to provide some means of error notification and handling. For example, if a broadcast of interactive television program is interrupted part way through recording, the television receiver can be configured in a way so as to insert a notification in the data stream. During playback, the media center can detect this notification, e.g., by establishing a specific table_id for error notification packets, and inform the user that some error occurred during recording. In several such embodiments, the media center can be further configured, e.g., by use of an appropriate plug-in in the playback module, to query the receiver for any available additional information regarding the interruption in service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for displaying stored interactive content, comprising:
   A content source configured to provide interactive content;
      a signal receiver; and a media center configured to:
   receive interactive content from the content source through the signal receiver, the interactive content comprising one or more user experience elements and a television program, wherein the one or more user experience elements are one of subdivided and broken down across a first plurality of packets;
   examine the interactive content, wherein the first plurality of packets associated with the one or more user experience elements are identified to reassemble the one or more experience elements prior to storage by:
      inserting each payload of the first plurality of packets into a table in a table section of each user experience element packet for reassembly,
      associating each table with a version number and a table identifier in a header section of each user experience element packet, and
      using each table identifier to identify a type of each packet and as the user experience element packet;
   store the interactive content in a memory coupled to the media center; and
   extract the stored interactive content and user experience elements from the memory and a deMUX, is configured to extract packets related to user experience elements and pass the extracted packets to selected plug-in modules from a plurality of plug-in modules.

2. The system of claim 1, wherein
the signal receiver is a digital television signal receiver.

3. The system of claim 1,
wherein the signal receiver, further configured to interpret the interactive content.

4. The system of claim 1, wherein the interactive content comprises a second plurality of packets, associated with the television program.

5. The system of claim 1, wherein the first plurality of packets is identified by matching a known value with a value contained in each of the first plurality of packets.

6. The system of claim 1, wherein the interactive content comprises an MPEG-2 transport stream, and each of the first plurality of packets comprise an MPEG-2 transport stream adaptation field packet.

7. The system of claim 1, wherein the interactive content is stored, in a manner such as to enable the one or more user experience elements to be utilized in conjunction with the television program.

8. The system of claim 1, wherein the one or more user experience elements are passed to a selected handler.

9. A method for displaying stored interactive content, the method comprising:
   receiving interactive content at an input module, the interactive content comprising at least a first plurality of packets associated with one or more user experience elements and a second plurality of packets associated with a television program, wherein the one or more user experience elements are one of subdivided and broken down across the first plurality of packets;
   examining the interactive content at a capture module coupled to the input module, wherein the first plurality of packets associated with one or more user experience elements are identified to reassemble the one or more experience elements by:
      inserting each payload of the first plurality of packets into a table in a table section of each user experience element packet for reassembly,
      associating each table with a version number and a table identifier in a header section of each user experience element packet, and
      using each table identifier to identify a type of each packet and as the user experience element packet;
   storing the interactive content at a storage module, coupled to the capture module; and
   extracting the stored interactive content and user experience elements from the storage module at a playback module coupled to the storage module, wherein the playback module includes a plurality of plug-in modules and a deMUX module, the deMUX module configured to extract packets related to user experience elements and pass the extracted packets to selected plug-in modules.

10. The method of claim 9, further comprising:
   receiving the interactive content at the input module from a digital television signal receiver.

11. The method of claim 9, further comprising:
identifying the first plurality of packets at the capture module by matching a known value with a value contained in each of the first plurality of packets.

12. The method of claim 9, further comprising:
storing the interactive content in the storage module to enable the one or more user experience elements to be utilized in conjunction with the television program.

13. The method of claim 9, wherein the interactive content comprises an MPEG-2 transport stream, and each of the first plurality of packets comprise an MPEG-2 transport stream adaptation field packet.

14. The method of claim 9, further comprising:
determining a handler to process each of the first plurality of packets.

15. The method of claim 14, further comprising:
passing the one or more user experience elements from the playback module to a selected handler associated with the user experience elements.

16. A computing device to display stored interactive content, the computing device comprising:
a memory; and
a media center coupled to the memory, the media center configured to:
receive interactive content from a content source through a signal receiver, the interactive content comprising one or more user experience elements and a television program, wherein the one or more user experience elements are one of subdivided and broken down across a first plurality of packets;
examine the interactive content; wherein the first plurality of packets associated with the one or more user experience elements are identified to reassemble the one or more experience elements by:
inserting each payload of the first plurality of packets into a table in a table section of each user experience element packet for reassembly,
associating each table with a version number and a table identifier in a header section of each user experience element packet, and
using each table identifier to identify a type of each packet and as the user experience element packet;
store the interactive content in the memory; and
extract the stored interactive content and the one or more user experience elements from the memory and a deMUX is configured to extract packets related to the user experience elements and pass the extracted packets to selected plug-in modules from a plurality of plug-in modules.

17. The computing device of claim 16, wherein the media center is further configured to:
identify at least the first plurality of packets associated with the one or more user experience elements and a second plurality of packets associated with the television program by matching a known value with a value contained in each of the first plurality of packets.

18. The computing device of claim 17, wherein the media center includes a filter module-configured to examine the first and second plurality of packets to identify adaptation field (AF) packets, and to further filter the AF packets to identify the one or more user experience elements.

* * * * *